(12) United States Patent
Harpur et al.

(10) Patent No.: US 7,958,244 B2
(45) Date of Patent: Jun. 7, 2011

(54) IMPOSED POLICIES FOR HANDLING INSTANT MESSAGES

(75) Inventors: Liam Harpur, Dublin (IE); Patrick J. O'Sullivan, Dublin (IE); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 12/567,539

(22) Filed: Sep. 25, 2009

(65) Prior Publication Data

US 2011/0078248 A1    Mar. 31, 2011

(51) Int. Cl.
*G06F 15/16* (2006.01)
(52) U.S. Cl. ........................... 709/227; 709/204
(58) Field of Classification Search .................. 709/204, 709/227
See application file for complete search history.

(56) References Cited

U.S. PATENT DOCUMENTS

| | | | |
|---|---|---|---|
| 6,691,162 B1 | 2/2004 | Wick | |
| 6,798,755 B2 * | 9/2004 | Lillie et al. | 370/312 |
| 6,822,945 B2 | 11/2004 | Petrovykh | |
| 6,891,934 B1 | 5/2005 | Gao et al. | |
| 6,973,620 B2 | 12/2005 | Gusler et al. | |
| 7,003,087 B2 | 2/2006 | Spencer et al. | |
| 7,023,813 B2 * | 4/2006 | Newberg et al. | 370/312 |
| 7,123,695 B2 | 10/2006 | Malik | |
| 7,162,513 B1 | 1/2007 | Kister et al. | |
| 7,260,205 B1 | 8/2007 | Murphy et al. | |
| 7,269,623 B2 * | 9/2007 | Neely et al. | 709/205 |
| 7,278,108 B2 * | 10/2007 | Duarte et al. | 715/758 |
| 7,366,780 B2 * | 4/2008 | Keller et al. | 709/227 |
| 7,480,696 B2 * | 1/2009 | Kirkland et al. | 709/207 |
| 7,571,249 B2 * | 8/2009 | Wu | 709/238 |
| 7,617,283 B2 * | 11/2009 | Aaron et al. | 709/206 |
| 7,649,890 B2 * | 1/2010 | Mizutani et al. | 370/395.21 |
| 7,676,580 B2 * | 3/2010 | Hill et al. | 709/227 |
| 7,693,952 B2 * | 4/2010 | Limprecht et al. | 709/207 |
| 7,844,666 B2 * | 11/2010 | Horvitz et al. | 709/206 |
| 2002/0095474 A1 * | 7/2002 | Boys | 709/217 |
| 2003/0131064 A1 * | 7/2003 | Bell et al. | 709/206 |
| 2004/0139157 A1 * | 7/2004 | Neely et al. | 709/205 |
| 2004/0230683 A1 * | 11/2004 | Adamczyk et al. | 709/227 |
| 2006/0036688 A1 * | 2/2006 | McMahan et al. | 709/206 |
| 2007/0022172 A1 * | 1/2007 | Anglin et al. | 709/207 |
| 2008/0028031 A1 * | 1/2008 | Bailey et al. | 709/207 |
| 2008/0162642 A1 * | 7/2008 | Bachiri et al. | 709/206 |
| 2010/0217822 A1 * | 8/2010 | Katis et al. | 709/206 |
| 2010/0228825 A1 * | 9/2010 | Hegde et al. | 709/204 |
| 2010/0299393 A1 * | 11/2010 | O'Sullivan et al. | 709/206 |

* cited by examiner

*Primary Examiner* — Michael Won
(74) *Attorney, Agent, or Firm* — Law Office of Jim Boice

(57) ABSTRACT

Chat sessions are managed between at least one sending computer and a receiving computer. A first chat session is initiated by a receiving computer in response to a first request from a first sending computer. A second chat session is initiated by the receiving computer in response to a second request from a second sending computer. The first and second chat sessions are prioritized in accordance with priority parameters to identify a higher priority chat session and a lower priority chat session. The lower priority chat session is restricted until the higher priority chat session is downgraded to a priority level that is below the lower priority chat session.

18 Claims, 5 Drawing Sheets

IMPOSED POLICIES FOR HANDLING INSTANT MESSAGES

BACKGROUND

The present disclosure relates to the field of computers, and specifically to messages between computers. Still more particularly, the present disclosure relates to instant messaging.

BRIEF SUMMARY

Chat sessions are managed between at least one sending computer and a receiving computer. A first chat session is initiated by a receiving computer in response to a first request from a first sending computer. A second chat session is initiated by the receiving computer in response to a second request from a second sending computer. The first and second chat sessions are prioritized in accordance with priority parameters to identify a higher priority chat session and a lower priority chat session. The lower priority chat session is restricted until the higher priority chat session is downgraded to a priority level that is below the lower priority chat session.

DETAILED DESCRIPTION

Figure 1:
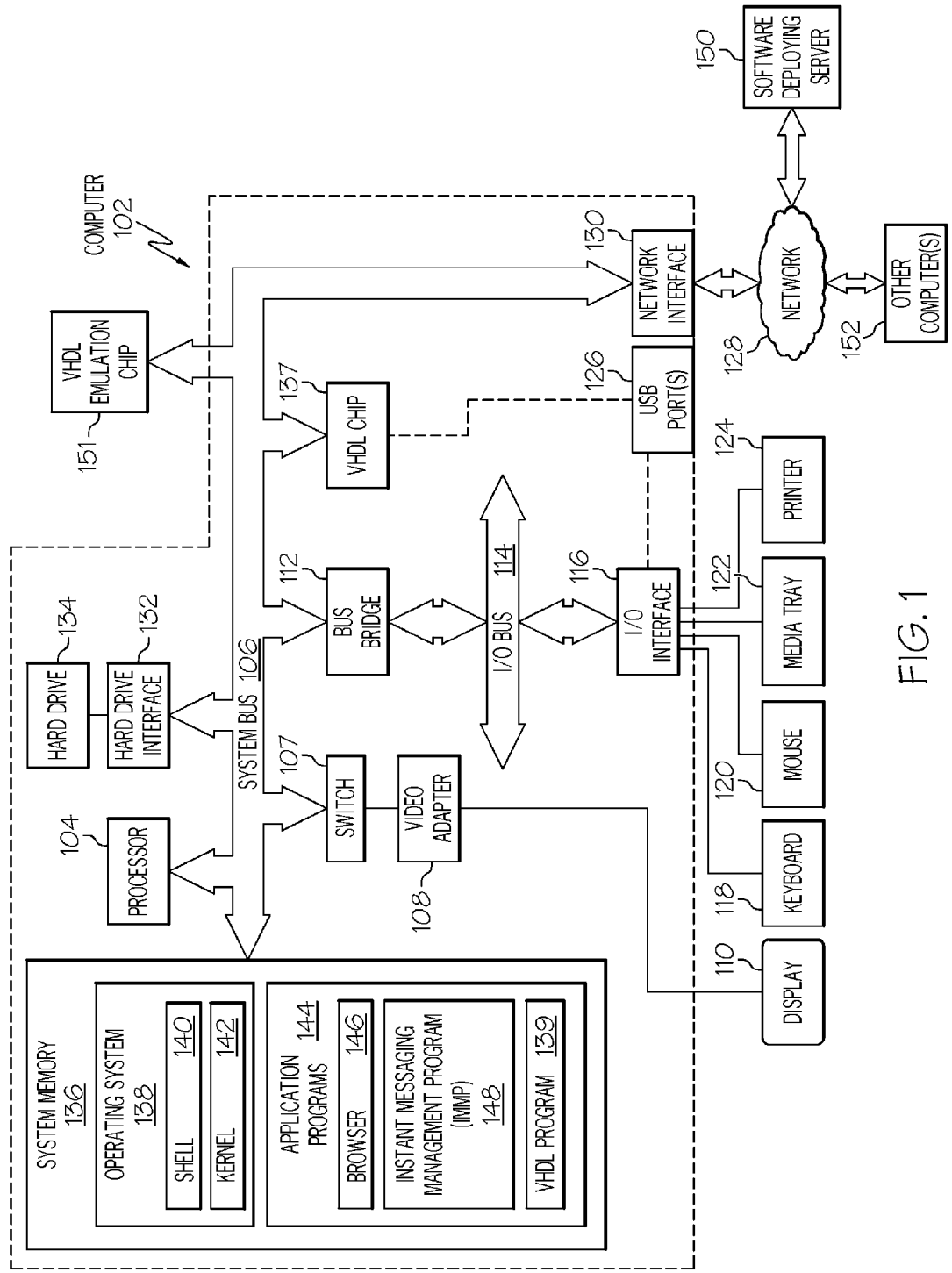
FIG. 1 depicts an exemplary computer in which the present invention may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Note that the terms "instant messaging" and "chat", as well as "instant messaging session" and "chat session", as used herein are understood to be interchangeable terms used to describe real-time communication between two or more users using typed text, which is communicated between computing devices that are coupled over a network. Similarly, any other terms and/or phrases that incorporate the terms "instant messaging" or "chat" are considered to be interchangeable.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150 and/or other computer(s) 152.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., instant messaging management program—IMMP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 and a sender's SMTP server 152 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include an instant message management program (IMMP) 148. IMMP 148 includes code for implementing the processes described below, including those described in FIGS. 2-5. In one embodiment, computer 102 is able to download IMMP 148 from software deploying server 150, including in an on-demand basis. Note further that, in one embodiment of the present invention, software deploying server 150 performs all of the functions associated with the present invention (including execution of IMMP 148), thus freeing computer 102 from having to use its own internal computing resources to execute IMMP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from IMMP 148 causes VHDL program 139 to configure VHDL chip 137, which may be an FPGA, ASIC, etc.

In another embodiment of the present invention, execution of instructions from IMMP 148 results in a utilization of VHDL program 139 to program a VHDL emulation chip 151. VHDL emulation chip 151 may incorporate a similar architecture as described above for VHDL chip 137. Once IMMP 148 and VHDL program 139 program VHDL emulation chip 151, VHDL emulation chip 151 performs, as hardware, some or all functions described by one or more executions of some or all of the instructions found in IMMP 148. That is, the VHDL emulation chip 151 is a hardware emulation of some or all of the software instructions found in IMMP 148. In one embodiment, VHDL emulation chip 151 is a programmable read only memory (PROM) that, once burned in accordance with instructions from IMMP 148 and VHDL program 139, is permanently transformed into a new circuitry that performs the functions needed to perform the process described below in FIGS. 2-5.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like.

These and other variations are intended to be within the spirit and scope of the present invention.

Figure 2:
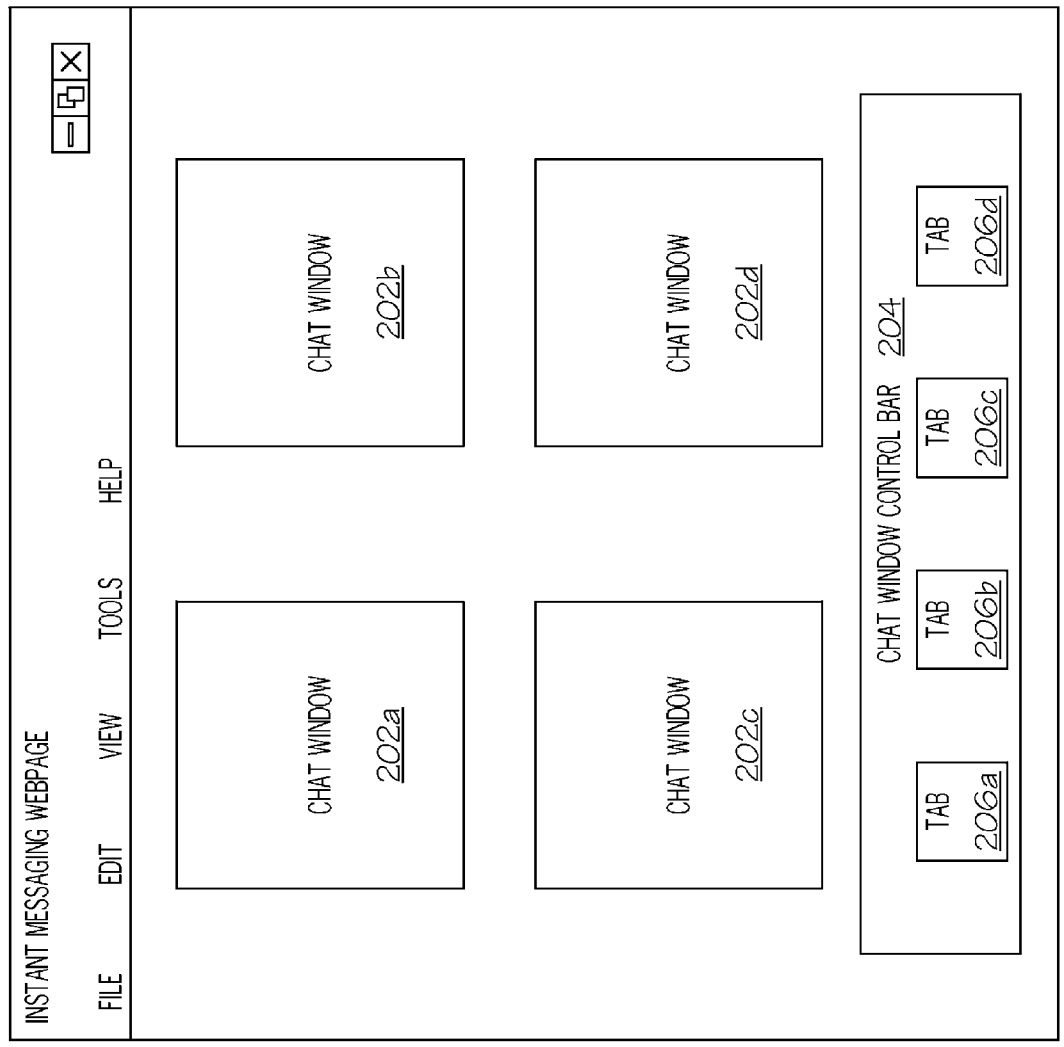
FIG. 2 illustrates an exemplary graphical user interface (GUI) displaying multiple chat windows.

With reference now to FIG. 2, an exemplary graphical user interface (GUI) 200 displaying multiple chat windows 202a-d as utilized by the present disclosure is presented. One or more of the chat windows 202a-d may be displayed as "pop-ups" in response to a chat partner sending a chat message. A most recently used chat window may be highlighted and/or displayed alone while other chat windows are hidden (not shown). Alternatively, a chat window control bar 204, having tabs 206a-d for respective chat windows 202a-d, may be used to allow a user to manually display one or more of the chat windows 202a-d. In either scenario, however, without the present invention a user is unable to throttle back how many chat sessions he is participating in. That is, while a user may not want to eliminate a chat partner from a list of approved chat partners, that user may still want to manage and control which chat partners are given priority when engaged with the user. Without the presently disclosed method and apparatus, such "throttling" is impractical, if not impossible.

Figure 3:
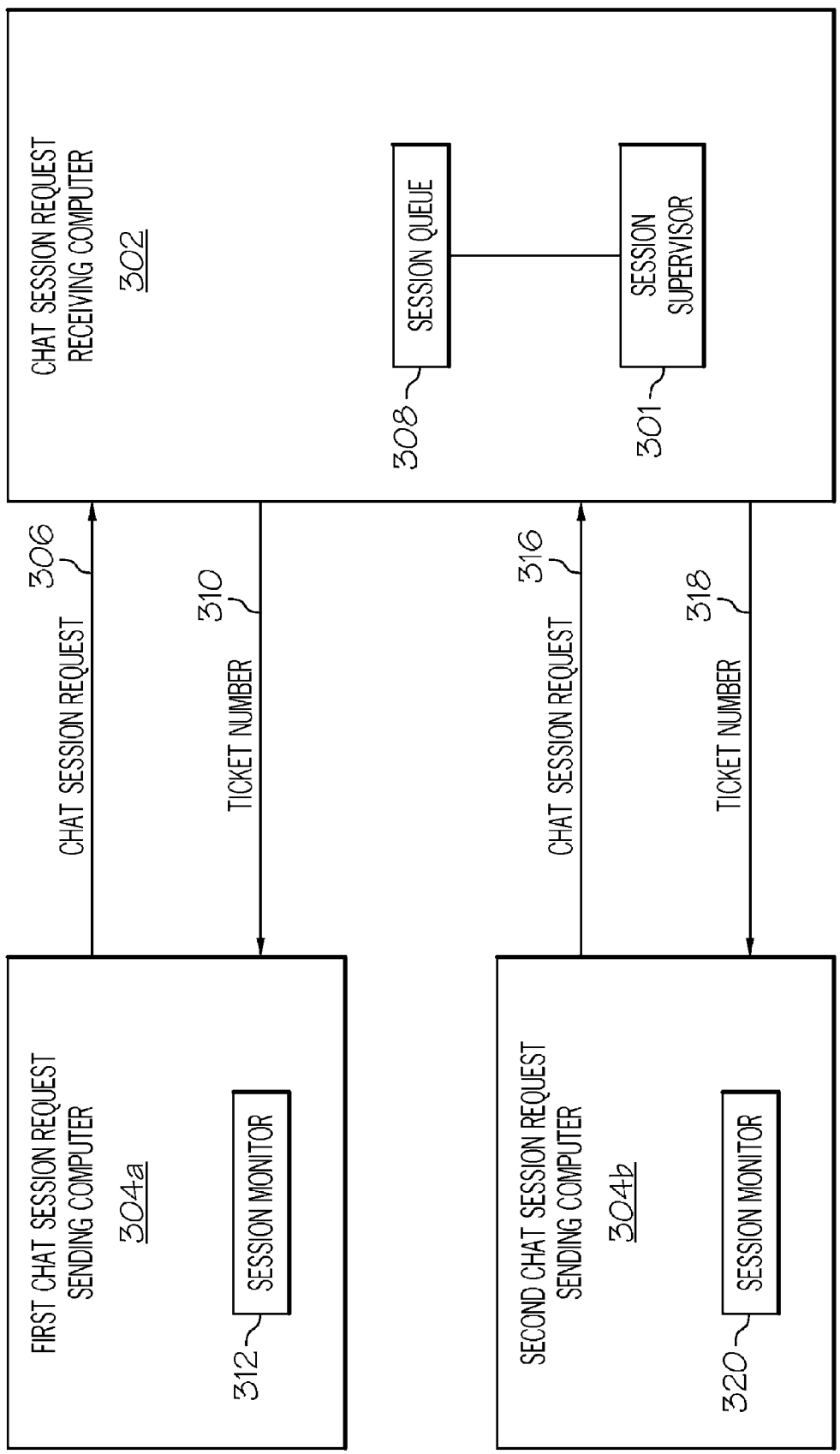
FIG. 3 depicts a chat session request receiving computer responding to chat session requests from one or more chat session request sending computers.
Figure 4:
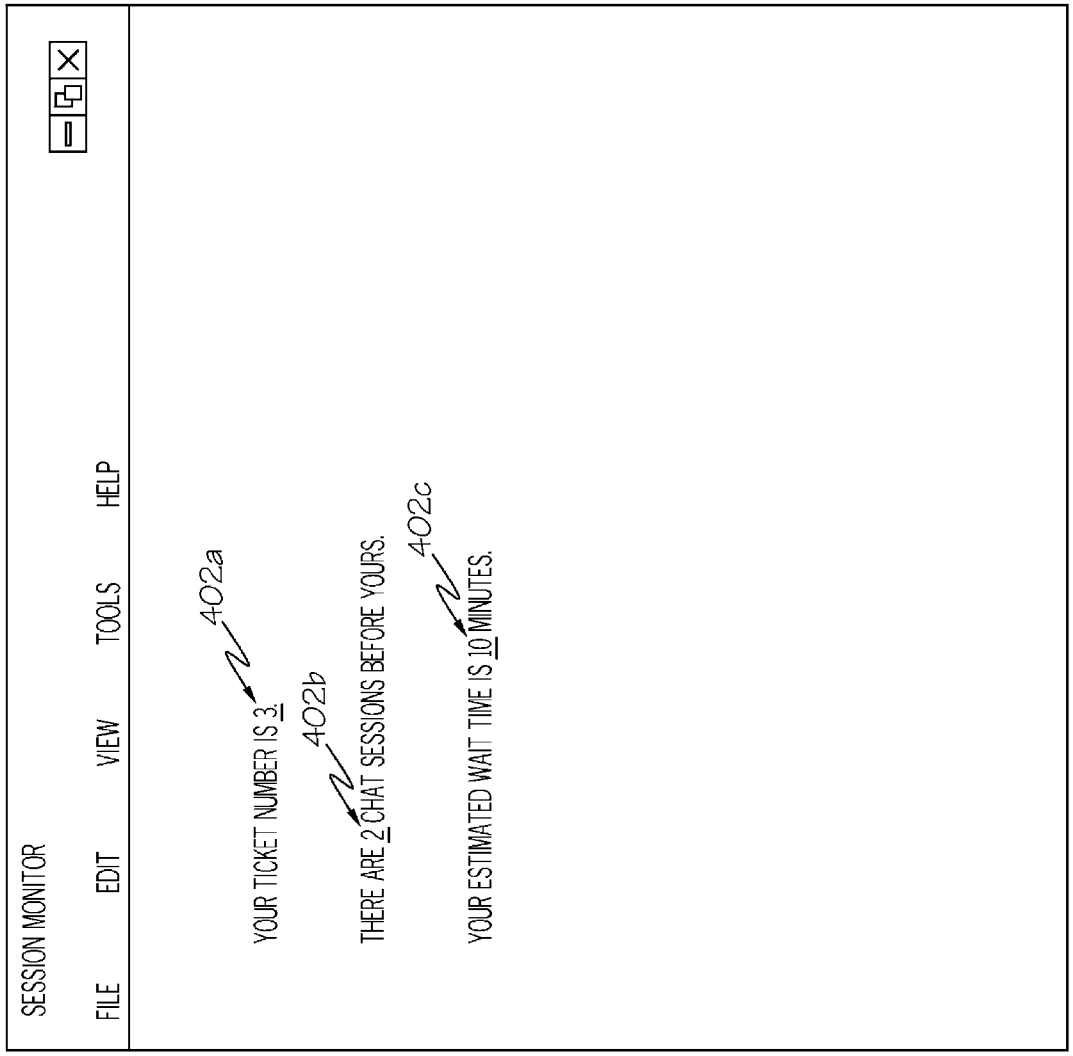
FIG. 4 illustrates a GUI that is displayed to a chat session request sending computer to describe a chat queue status at the chat session request receiving computer shown in FIG. 3.

One embodiment of the present invention is illustrated in an exemplary manner in FIG. 3, which depicts a chat session request receiving computer 302 responding to chat session requests from one or more chat session request sending computers 304a-b. Chat session request receiving computer 302 is analogous to computer 102 described above and shown in FIG. 1, and chat session request sending computers 304a-b are analogous to other computer(s) 152 shown in FIG. 1. Similarly, a user of chat session request receiving computer 302 views the GUI 200, indicating that the user is being overwhelmed by too many chat sessions if the present invention is not implemented.

Assume that first chat session request sending computer 304a initially sends a chat session request 306 to chat session request receiving computer 302. Utilizing a session supervisor 301, which may be part of IMMP 148 shown in FIG. 1, chat session request receiving computer 302 first checks a local session queue 308 to see how many chat session participants are "in front of" a user of the first chat session request sending computer 304a. Based on that user's position in line, a ticket number 310 is returned to the first chat session request sending computer 304a. This ticket number 310 describes what place the user of first chat session request sending computer 304a holds in session queue 308. This allows a session monitor 312 (which in one embodiment is a component of IMMP 148 shown in FIG. 1) to monitor when the user of first chat session request sending computer 304a is authorized to engage in a chat session with a user of chat session request receiving computer 302. Subsequently, a second user, who is using second chat session request sending computer 304b, sends a chat session request 316 to chat session request receiving computer 302. This chat session request 316 results in another ticket number 318 being sent to session monitor 320. Thus, ticket number 318 is a lower priority ticket number and ticket number 310 is a higher priority ticket number, thus giving the user of the first chat session request sending computer 304a a higher place in line in session queue 308 than a user of the second chat session request sending computer 304b. In this scenario, the holder of the lower priority ticket number must wait until the holder of the higher priority ticket number has completed or otherwise terminated (e.g., allowed a timer to expire) his chat session with the chat session request receiving computer 302.

Unless the user of second chat session request sending computer 304b has been granted an overriding higher priority, by session supervisor 301, which allows him to effectively override and terminate a current chat session between chat session request receiving computer 302 and some other computer (e.g., first chat session request sending computer 304a), the user of second chat session request sending computer 304b then takes the last place in line in session queue 308. If session supervisor 301 does allow the user of second chat session request sending computer 304b to evict (override and terminate) the current chat session being held with the first chat session request sending computer 304a, then a message may be sent from the chat session request receiving computer 302 to the first chat session request sending computer 304a stating "Your session is suspended for the time being due to a higher priority communication." This message may be displayed on the GUI used by first chat session request sending computer 304a. As depicted in FIG. 3, one embodiment of the present disclosure provides the chat session request receiving computer 302 with the ability to supervise the prioritization, initiation, and terminations of all chat sessions from multiple chat session request sending computers 304a-b. In another embodiment, this control can be performed by a supervisory computer (not shown), which is in communication with the chat session request sending computers 304a-b as well as the chat session request receiving computer 302.

Assume now that chat sessions with a user of chat session request receiving computer 302 are only going to occur one chat session at a time, and that no user has priority over another user. In this embodiment, whoever is at the top of the session queue 308 is the user that will be allowed to have a chat session with the user of the chat session request receiving computer 302. In such an embodiment, each user who is waiting for a chat session has to wait until he is at the top of session queue 308. In order to know what place they hold in the session queue 308, waiting users view a GUI 400 (shown in FIG. 4) on their respective computers. GUI 400 lets the user know what his ticket number is (402a), how many other users are waiting to have a chat session (402b), and what the estimated wait time is until the user will be at the top of the queue (402c). Elements 402a-c are automatically updated by chat session request receiving computer 302 using software found in IMMP 148.

Figure 5:
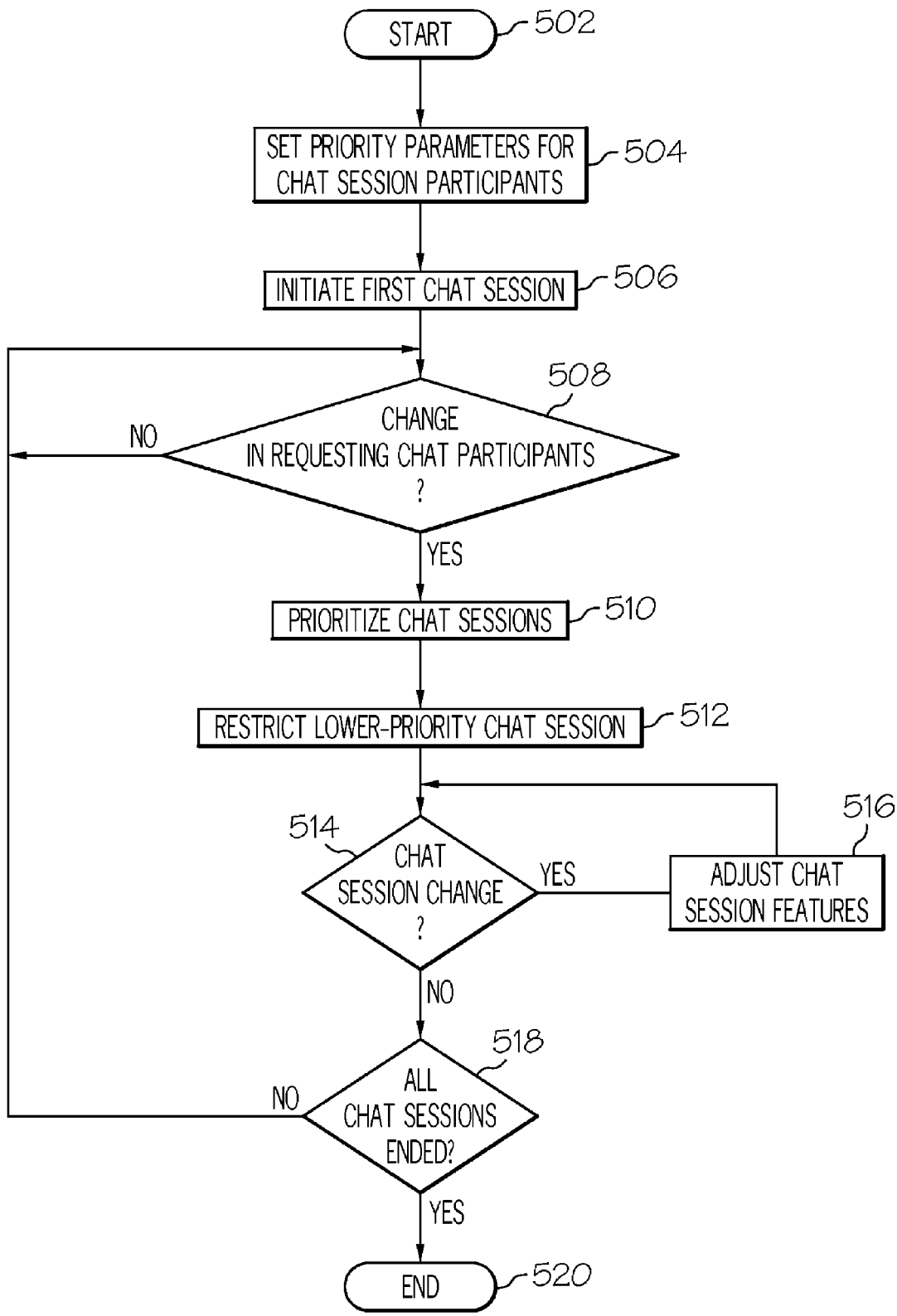
FIG. 5 is a high-level flow-chart of exemplary steps processed by a computer to manage chat sessions.

With reference now to FIG. 5, a high-level flow-chart of exemplary steps taken in a more complex embodiment of the present invention is presented. After initiator block 502, which may be prompted by a user (e.g., an end user of chat session request receiving computer 302 shown in FIG. 3; a system administrator; etc.), or a set of rules and/or policies associated with and set for a receiving computer, determining that the user needs to throttle and control who is able to have chat sessions with her (and under what parameters/criteria/guidelines), a receiving computer sets priority parameters for chat session participants (block 504). These priority parameters may be set by the receiver of the request for a chat session, a remote manager, business logic, emergency conditions, etc. For example, the priority parameter may be simply based on "who asked first" when requesting a chat session with the receiving computer. In another embodiment, specific users (which may be identified by specific IDs in a table—not shown) are assigned priorities, such that one specific person has priority over another specific person when engaging in a chat session with the receiving computer. In another embodiment, the priority parameter is based on a relationship with a chat session requester and the receiving user. Thus, a boss, babysitter, spouse, customer, etc. may be given higher priority over friends, distant relatives, etc. In such a scenario, a receiver's boss may be able to "kick off" another chat session participant if that boss has a higher priority than the other chat session participant. Likewise, a chat requester who deems his chat to be an emergency (or who has previously been given ultimate priority) will be able to usurp control of the receiving computer's chat session execution. Note that, in one embodiment, setting priority parameters as shown in block 504 is performed once for all future chat sessions. That is, the priority parameters are set by the receiving user and/or rules/ policies such that all future chat sessions are controlled according to these priority parameters. Thus, any future higher-priority chat user that evicts a lower-priority chat user is also controlled by these same priority parameters, and thus can be evicted by an even higher-priority user.

Referring now to block 506, a first chat session between the receiving computer (e.g., chat session request receiving computer 302 shown in FIG. 3) and a first sending computer (e.g., first chat session request sending computer 304*a*) is initiated. In one embodiment, when this first chat session (or another higher priority chat session) is initiated, a GUI on the sending computer that is having a chat session is temporarily blocked from displaying any other application windows other than a chat window. Thus, the user of the sending computer is forced to focus all attention on the chat session, resulting in the chat session with the receiving computer likely being shorter. Similarly, if the user of the receiving computer does not respond to a chat message from the sending computer within a predetermined period of time, the receiving computer will automatically send the sending computer a pre-set message, such as "Your message is important; please stand by", an advertisement, streaming music, etc., all of which are designed to ask the user of the initial sending computer for more time while the user of the receiving computer composes a responsive instant message.

If another user wants to initiate a chat session with the receiving computer (query block 508), then the existing chat session participant and the new requesting chat session participant and their actual/potential sessions are prioritized (block 510) in accordance with the priority parameters set in block 504. This prioritization results in a lower-priority chat session being restricted (block 512), such that this lower-priority chat session has fewer privileges that a higher-priority chat session. In one embodiment, these lower privileges mean that the lower-priority chat session is suspended until it is elevated to a higher-priority chat session (e.g., the previous higher-priority chat session is ended).

In one embodiment, prioritizing chat sessions (block 510) results in active and waiting chat sessions/users being placed in a queue (e.g., session queue 308 shown in FIG. 3), which can be used to generate ticket numbers in a manner described above. This queue, along with the waiting chat sessions/users, can be displayed on a GUI at the receiving computer, thus allowing the user of that computer to know how many sessions/users are in line. If too many chat sessions/users are in that user's queue, then the user or software logic can make appropriate adjustments (e.g., re-routing waiting sessions/ users to another service representative, sending updated wait messages to the waiting users, etc.). In one embodiment, restricting the lower priority chat session until the higher priority chat session is downgraded to a priority level that is below the lower priority chat session is performed by the chat session request receiving computer (e.g., 302) temporarily preventing itself from displaying, on its own GUI, anything other than the chat window for the higher priority chat session. In another embodiment, this restricting is performed by the chat session request receiving computer still displaying other windows, including other chat windows, but only allowing the chat window for the current higher priority chat session to be active. In this embodiment, other windows, including browser windows, e-mail windows, etc. are still active, but only the higher priority chat session window among the chat session windows is also active.

Referring now to query block 514, a current chat session may change. That is, the current chat session may end (i.e., ending the current chat session is an ultimate downgrading of the current higher priority chat session to a priority level that is below a lower priority chat session); a user with a higher priority may be requesting a chat session (thus resulting in the current user being "kicked out"); etc. If so, then chat session features are adjusted (block 516). This adjustment may be kicking a current chat user off, sending a message to the current chat user that his session is over (due to the current chat user affirmatively choosing to end the chat session in response to a "Are you done?" message; a time-out period elapsing; a higher-priority user requesting a new chat session; etc.), modifying how many chat sessions can be held simultaneously by the receiving computer, etc. If the current chat session is ended, then in one embodiment the user who just finished the chat session may be prevented from initiating another chat session with the receiving computer until all other existing sessions/users in the session queue have had their turn at a chat session with the receiving computer.

As soon as there are no more sessions/users in the session queue (query block 518), indicating that all chat sessions have ended, the process ends (terminator block 520).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer-implemented method of managing chat sessions between at least one sending computer and a receiving computer, the computer-implemented method comprising:
    setting priority parameters for chat sessions;
    initiating a first chat session for a receiving computer in response to a first request by a first sending computer;
    initiating a second chat session for the receiving computer in response to a second request by a second sending computer;
    prioritizing the first and second chat sessions in accordance with the priority parameters to identify a higher priority chat session and a lower priority chat session;
    restricting the lower priority chat session until the higher priority chat session is downgraded to a priority level that is below the lower priority chat session; and
    displaying a queue of multiple pending chat sessions on the receiving computer, wherein the queue depicts an order of response to future chat messages.

2. The computer-implemented method of claim 1, wherein the priority parameters are based on job positions of members of an enterprise, and wherein a holder of a higher job position in the enterprise is assigned a higher priority ticket number and a holder of a lower job position in the enterprise is assigned a lower priority ticket number such that the holder of the higher job position overrides the lower priority chat session with the holder of the lower job position.

3. The computer-implemented method of claim 1, wherein said restricting the lower priority chat session until the higher priority chat session is downgraded to a priority level that is below the lower priority chat session comprises:
    temporarily blocking a graphical user interface (GUI) on the receiving computer from displaying any other application windows other than a chat window for the higher priority chat session in response to the receiving computer receiving a request for the higher priority chat session.

4. The computer-implemented method of claim 1, further comprising:
    automatically transmitting a pre-set message to the higher priority chat session in response to the receiving computer failing to respond to a chat message in the higher priority chat session within a predetermined period of time, wherein the pre-set message requests additional time for the receiving computer to respond to the chat message.

5. The computer-implemented method of claim 1, further comprising: transmitting an update of queue status to a sender of a chat session request in response to the queue changing.

6. The computer-implemented method of claim 1, further comprising: preventing the higher priority chat session sending computer from initiating another chat session with the receiving computer until all other chat sessions represented by the queue have completed their chat sessions in response to the higher priority chat session being completed.

7. The computer-implemented method of claim 1, further comprising: permitting a chat session with the receiving computer to be held only with the top position on the queue.

8. The computer-implemented method of claim 1, further comprising:
    generating a higher priority ticket number for the higher priority chat session;
    generating a lower priority ticket number for the lower priority chat session; and
    transmitting the lower priority ticket number to the lower priority chat session sending computer, wherein the lower priority chat session is restricted until the higher priority chat session has completed.

9. The computer-implemented method of claim 8, further comprising:
    automatically adjusting the lower priority ticket number to the higher priority ticket number when the higher priority chat session is completed; and
    transmitting the higher priority ticket number to the lower priority chat session to prompt sending a new chat message to the receiving computer in response to the higher priority chat session completing.

10. A computer program product comprising a computer readable storage device embodied therewith, the computer readable storage device comprising:
    computer readable program code configured to set priority parameters for chat sessions;
    computer readable program code configured to initiate a first chat session at a receiving computer in response to a first request by a first sending computer;
    computer readable program code configured to initiate a second chat session at the receiving computer in response to a second request by a second sending computer;
    computer readable program code configured to prioritize the first and second chat sessions in accordance with the priority parameters to identify a higher priority chat session and a lower priority chat session;
    computer readable program code configured to restrict the lower priority chat session until the higher priority chat session is downgraded to a priority level that is below the lower priority chat session; and
    computer readable program code configured to display a queue of multiple pending chat sessions on the receiving computer, wherein the queue depicts an order of response to future chat messages.

11. The computer program product of claim 10, wherein the priority parameters are based on job positions of members of an enterprise, and wherein a holder of a higher job position is assigned the higher priority ticket number and a holder of a lower job position is assigned the lower priority ticket number such that the holder of the higher job position overrides the lower priority chat session with the holder of the lower job position.

12. The computer program product of claim 10, further comprising:
    computer readable program code configured to temporarily block a graphical user interface (GUI) on the receiving computer from displaying any other application windows other than a chat window for the higher priority chat session in response to the receiving computer receiving a request for the higher priority chat session.

13. The computer program product of claim 10, further comprising:

computer readable program code configured to automatically transmit a pre-set message to the higher priority chat session in response to the receiving computer failing to respond to a chat message in the higher priority chat session within a predetermined period of time, wherein the pre-set message requests additional time for the receiving computer to respond to the chat message.

14. The computer program product of claim 10, wherein all of said computer readable program code is downloaded from a software deploying server to a client computer in an on-demand basis.

15. A computer system comprising:

a central processing unit; and a computer readable memory coupled to the central processing unit, wherein the computer readable memory comprises software which, when executed, causes the central processing unit to implement:

setting priority parameters for chat sessions;

initiating a first chat session by a receiving computer in response to a first request by a first sending computer;

initiating a second chat session by the receiving computer in response to a second request by a second sending computer;

prioritizing the first and second chat sessions in accordance with the priority parameters to identify a higher priority chat session and a lower priority chat session;

restricting the lower priority chat session until the higher priority chat session is downgraded to a priority level that is below the lower priority chat session; and displaying a queue of multiple pending chat sessions on the receiving computer, wherein the queue depicts an order of response to future chat messages.

16. The computer system of claim 15, wherein the priority parameters are based on job positions of members of an enterprise, and wherein a holder of a higher job position is assigned the higher priority ticket number and a holder of a lower job position is assigned the lower priority ticket number such that the holder of the higher job position overrides the lower priority chat session with the holder of the lower job position.

17. The computer system of claim 15, wherein the software, which, when executed, further causes the central processing unit to implement:

temporarily blocking a graphical user interface (GUI) on the receiving computer from displaying any other application windows other than a chat window for the higher priority chat session in response to the receiving computer receiving a request for the higher priority chat session.

18. The computer system of claim 15, wherein the software, which, when executed, further causes the central processing unit to implement:

automatically transmitting a pre-set message to the higher priority chat session in response to the receiving computer failing to respond to a chat message in the higher priority chat session within a predetermined period of time, wherein the pre-set message requests additional time for the receiving computer to respond to the chat message.

* * * * *